Nov. 12, 1935.                F. C. DANNEMANN                2,020,537
                               LUBRICATING DEVICE
                               Filed July 6, 1931

INVENTOR
FREDERICK C. DANNEMANN
BY HIS ATTORNEY

Patented Nov. 12, 1935

2,020,537

UNITED STATES PATENT OFFICE 2,020,537

LUBRICATING DEVICE

Frederick C. Dannemann, Ridgewood, N. Y.

Application July 6, 1931, Serial No. 548,786

3 Claims. (Cl. 308—5)

This invention relates to lubricating devices and more particularly refers to improvements in devices for lubricating the inner surface of a bushing or cylinder within which a rod or piston reciprocates. It is, of course, well known that proper lubrication is an essential in the operation of parts reciprocating within a housing such as a bushing or cylinder for instance, if smooth operation and long life of the contacting surfaces are to be assured. As a general rule, in all machines and devices comprising reciprocating elements of the character specified, oil ducts are provided adapted to convey oil to the inner surface of the bushing or cylinder, said oil becoming distributed over the contacting surfaces, due to the relative movement thereof. However, proper lubrication does not so much consist in supplying abundant quantities of oil or other lubricant at relatively long intervals as in supplying a very light film of oil or lubricant continuously during the operation of the reciprocating member.

A great many machines and tools comprising reciprocating parts with surfaces in contact with stationary surfaces are expected to operate continuously for relatively long periods of time, and under these conditions the surfaces in contact are likely to wear out or to produce unnecessary friction unless they are properly lubricated throughout.

Such a condition arises for instance, in connection with punch and die sets in which the punch is usually guided towards or away from the die by leader pins upwardly projecting from the die bed. A similar condition exists in pneumatic and other drills where the piston is caused to reciprocate within the cylinder at relatively high speed and for hours at a time.

The lubricant should possibly be spread over the entire area of the contacting surfaces, and should preferably be so distributed in very minute quantities at every stroke.

In these types of devices either the leader pin or the piston etc., as the case may be usually has an end surface forming a circular edge with the side surface, and said edge is the very part of the surface of the pin or piston which may press against the bushing of the cylinder engendering friction and wear after a device has been in use for some time. I have therefore conceived the idea of providing a lubricating device adapted to be attached to the end of the leader pin or rod or piston, said device coming in contact with the inner surface of the bushing or housing or cylinder during the reciprocating motion of either the pin or piston or housing, and lubricating those very parts of the surfaces which are most likely to be subjected to wear.

Accordingly the primary object of my invention is to provide a novel, simple and improved device attachable to the end of a leader pin or plunger or rod or piston, and adapted to lubricate the inner surface of a housing or cylinder therefor, during the reciprocating motion of either said plunger or piston, or housing with respect to the other element.

Another object is to provide a novel and improved device of the character specified adapted to carry its own supply of lubricant enabling it to lubricate surfaces coming in contact therewith continuously for relatively long periods of time.

A further object is to provide a device of the character specified, the construction of which is relatively simple and inexpensive, said device being adapted to be readily placed in position or removed therefrom.

Other objects and advantages of the present invention will more fully appear as the description proceeds and will be set forth and claimed in the appended claims.

My invention is illustrated by way of example in the accompanying drawing, in which.

Figure 1:
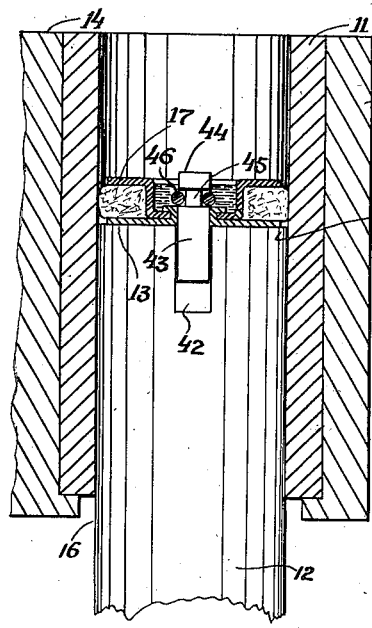
Fig. 1 is a fragmentary elevation partly sectioned of a portion of a die set showing a leader pin equipped with a lubricating device embodying my invention, inserted within a bushing of the punch holder.

Referring to Fig. 1, 10 designates a punch holder equipped with a bushing 11 within which is inserted a leader pin 12 upwardly projecting from the die bed underneath (not shown).

In this type of devices the punch holder moves up and down while the die bed is stationary, being bolted to the bed plate of the press so that the reciprocating movement between the contacting surfaces of the bushing and leader pin is due to the operation of the bushing and not to the operation of the pin. However, for the purposes of my invention it is immaterial whether the reciprocating part is the bushing or housing or the pin or piston or plunger, as will be understood.

The height of the leader pins is usually such that the upper surface 13 thereof does not reach or project above the upper surface 14 of the punch holder when the punch holder occupies its lowermost position, at the end of the down stroke of the press. This however, is not a necessary condition except in certain special cases. In practically all cases however, during the upward movement of the punch holder, and up to the point where the punch holder reaches its uppermost position, the upper surface 13 of the leader pin which forms the circular edge 15 with its cylindrical surface 16, reaches a position within the bushing, spaced a material distance from the upper end thereof, as the drawing shows.

Figure 2:
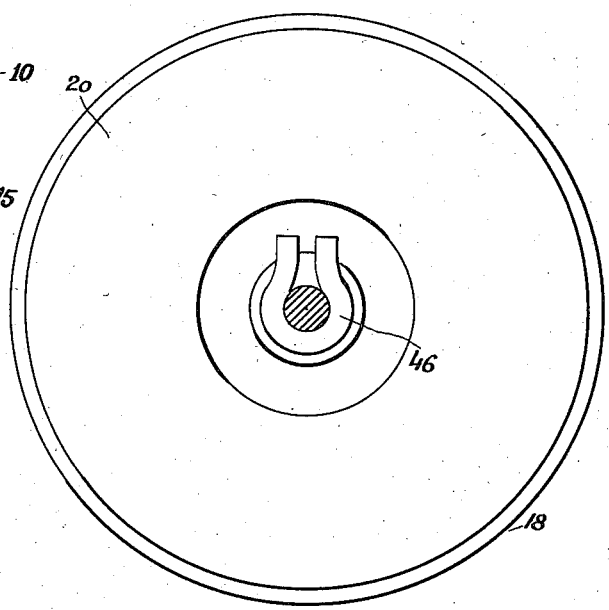
Fig. 2 is a plan view of said lubricating device and locking means therefor, in an enlarged scale.
Figure 3:
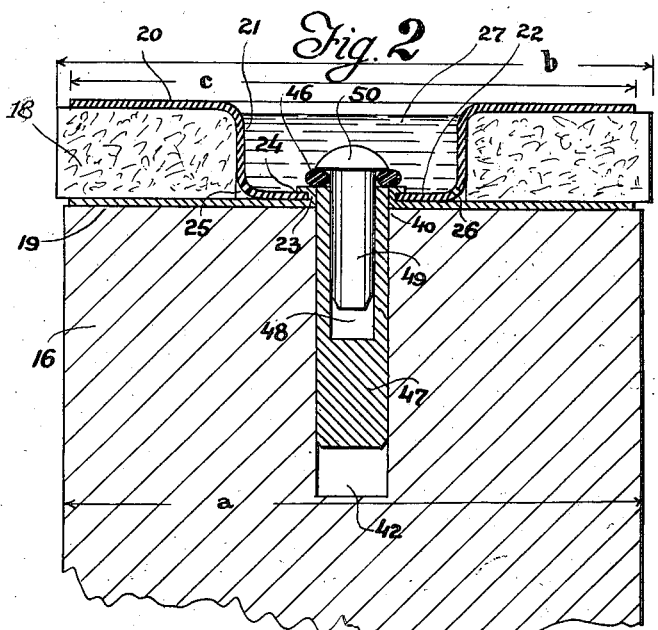
Fig. 3 is a fragmentary vertical section in an enlarged scale of the upper end of a leader pin equipped with the lubricating device shown in Fig. 1.

In order to provide proper lubrication of the contacting surfaces of the pin and bushing, the upper end of the pin is equipped with a lubricating device 17 embodying my invention, which is illustrated in greater detail in Figs. 2 and 3. Said device consists of a disk 18 made of a fabric or felt impregnated with a lubricating substance, the diameter of said disk being such as to tightly fit within the bushing in connection with which the same is to be used. More specifically, if $a$ designates the diameter of the leader pins 16 onto which the lubricating device is attached, the diameter $b$ of the lubricating disk is preferably slightly larger as Fig. 3 clearly shows.

The lubricating disk is clamped between two metal disks 19, 20 which provide both a suitable means for fastening the device onto the upper surface of the leader pin and a means for stiffening the lubricating disk and maintaining it in a flat condition, during the reciprocating movement of the bushing.

The diameter $c$ of metal disks 19, 20 is of course no larger than and is preferably somewhat smaller than the diameter $a$ of the leader pin.

In the preferred form, the lubricating disk is annular in shape and the central portion of the upper disk 20 is depressed to form a pocket or receptacle 21, the bottom of which 22 abuts against the upper surface of disk 19 and is attached thereto in any suitable manner. For instance, said bottom 22 may be formed with a central opening adapted to be inserted over the embossed tubular portion 23, upwardly extending from the center of disk 19, the lips of said tubular portion being turned over to form a retaining flange 24, locking disks 18, 19 to each other so as to securely retain in position the lubricating disk 18 inserted therebetween.

The central opening of the lubricating disk has a diameter corresponding to the outer diameter of pocket 21, as the drawing shows, and the side wall of said pocket is preferably perforated as shown at 25, 26 in order to permit lubricating oil 27 contained within pocket or receptacle 21 to reach the lubricating disk. When oil is used as the lubricating substance, the lubricating disk should be made of absorbent material, such as felt, for instance, adapted to retain oil for a long time even if the pocket or receptacle should be empty.

It will be observed that oil pocket or receptacle 21 is open at the top, this construction being suitable in such cases where the leader pin or other member equipped with the lubricating device is permanently set in a vertical position. In many cases however, the leader pin or other member carrying the lubricating device may be set in an inclined or horizontal position, and in such cases if a liquid lubricant is used and a supply is to be carried by the lubricating device it is necessary to close the oil pocket or receptacle in order to retain oil therein.

Figure 4:
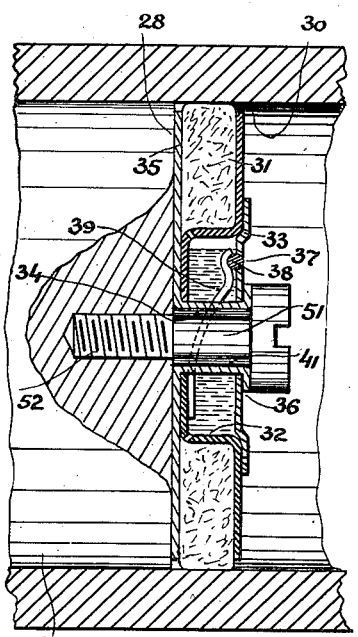
Fig. 4 is a fragmentary vertical section of a horizontal housing or cylinder within which a plunger reciprocates, said plunger being equipped with another lubricating device also embodying my invention.

Such an arrangement is illustrated in Fig. 4 where the end surface 28 of a plunger or piston 29 which reciprocates within a horizontal housing 30, is equipped with a lubricating device 31 having a central oil pocket 32, the top of which is closed by a disk or plate 33. In the construction shown, the embossed tubular portion 34 projecting from the lower metal disk 35 extends for and beyond the entire depth of the oil pocket 32, and covering or plate 33 is provided with a central opening inserted over said tubular portion. The edge of said tubular portion is then turned over to form a flange 36 retaining all the parts in their assembled condition.

In order to facilitate the supplying of lubricating oil to the oil pocket from time to time, the covering or plate 33 is provided with an opening 37, against which a ball 38 is normally held by a spring 39, said ball acting as a valve permitting the introduction of oil within the oil pocket and preventing the escape of said oil therefrom.

It is obvious that although it is preferable to use a good grade of light lubricating oil in connection with a lubricating disk made of suitable absorbent material, for the purposes of my invention it is quite feasible to employ a lubricating disk impregnated with a lubricating substance other than oil, if desired.

In each case, the lubricating device is provided with a central opening, as indicated by 40 in Fig. 3 and by 41 in Fig. 4, permitting of fastening the device in position. In the case of Fig. 1, the end of the leader pin is provided with an opening 42 within which is forced a pin 43 adapted to register with the opening 40 of the lubricating device, said pin having a head 44 connected to the body thereof, by a neck portion 45, adapted to receive a spring clip 46 after the lubricating device has been inserted over said pin, said clip 46 retaining the lubricating device in position.

Said spring clip is also shown in Figs. 2 and 3, where the leader pin is also provided with an opening 42 and a pin 47 adapted to register with the opening 40 and the lubricating device is forced within said opening 42. Pin 47 is forced in position so as to leave its upper end projecting from the upper surface of the leader pin so as to be flush with the upper surface and flange 24 of the lubricating device. Said pin 47 is in its turn provided with another axial opening 48 within which may be forced another pin 49 provided with a head 50. After the lubricating device has been inserted in position, the spring clip 46 can be forced over the projecting portion of pin 49 so as to retain the lubricating device in position. It will be understood that the spring clip can be removed at any time for the purpose of replacing a used or worn lubricating device with a new one without the use of any special tools.

The lubricating device can, of course, be secured in position, in ways other than those shown and described. For instance, in Fig. 4, I show the device held in position by a stud 51 provided with a threaded stem 52 screwed onto the end surface of plunger or piston 29.

Although in the drawing I have shown lubricating disks clamped between two retaining disks or plates, it is obvious that my inventive idea may be embodied in constructions other than those shown. The drawing will therefore be understood as being intended for illustrative purposes only and not in a limiting sense. Accordingly, I reserve the right to carry my invention into practice in all those ways and manners which may enter, fairly, into the scope of the appended claims.

I claim:

1. A device for lubricating the inner surface of a housing within which a piston member reciprocates, comprising a disc impregnated with lubricating material, said disc being adapted to register with the inside of said housing, two metallic discs permanently connected to each other clamping the lubricating disc therebetween, forming therewith a self-contained structure in unitary form, adapted to be secured onto the end of said reciprocating member, one of said metallic discs having a reflexed portion extending through said impregnated disc, and means passing through said reflexed portion and the other metallic disc for securing said structure to said reciprocating member.

2. A device for lubricating the inner surface of a housing within which a piston member reciprocates, comprising an annular disc impregnated with lubricating material, said disc being adapted to register with the inside of said housing, and two metallic discs permanently connected to each other clamping the lubricating disc therebetween, forming therewith a self-contained structure in unitary form, adapted to be secured onto the end of said reciprocating member, one of said metal discs being formed with a central pocket having perforated walls, said pocket being accessible for filling at the free end of said holder when the latter is secured to said reciprocating member, said pocket being adapted to receive oil and to distribute it to said lubricating disc, through its perforations, said device being formed with a central opening for fastening the same in position.

3. A lubrication device for a punch and die set, said punch and die set comprising a stationary die bed, a punch reciprocating with respect thereto, a leader pin projecting vertically through said punch from said die bed, said lubricating device carried by said leader pin and comprising in unitary form, a disc impregnated with lubricating material, having a diameter substantially corresponding to the diameter of the leader pin, a holder for said disc comprising two metallic discs permanently connected to each other, clamping the lubricating disc therebetween, one of said metallic discs being formed with a central pocket having perforated walls, said discs having a central opening and means inserted through said opening, securing said device onto the upper end of said leader pin, said pocket being accessible for filling at the free end of said holder when the latter is secured to said leader pin.

FREDERICK C. DANNEMANN.